(12) United States Patent
Easterling

(10) Patent No.: US 11,040,917 B2
(45) Date of Patent: Jun. 22, 2021

(54) PLANT ENHANCING COMPOSITION

(71) Applicant: John Harvey Easterling, Jupiter, FL (US)

(72) Inventor: John Harvey Easterling, Jupiter, FL (US)

( * ) Notice: Subject to any disclaimer, the term of this patent is extended or adjusted under 35 U.S.C. 154(b) by 156 days.

(21) Appl. No.: 16/256,570

(22) Filed: Jan. 24, 2019

(65) Prior Publication Data
US 2019/0225555 A1  Jul. 25, 2019

Related U.S. Application Data

(60) Provisional application No. 62/621,162, filed on Jan. 24, 2018.

(51) Int. Cl.
| | | |
|---|---|---|
| *C05D 9/00* | (2006.01) | |
| *C05F 5/00* | (2006.01) | |
| *C05F 11/08* | (2006.01) | |
| *C05G 3/80* | (2020.01) | |
| *C05G 5/23* | (2020.01) | |

(52) U.S. Cl.
CPC ............... *C05D 9/00* (2013.01); *C05F 5/002* (2013.01); *C05F 11/08* (2013.01); *C05G 3/80* (2020.02); *C05G 5/23* (2020.02)

(58) Field of Classification Search
CPC .... C05D 9/00; C05G 3/50; C05G 5/23; C05F 5/002; C05F 11/00
See application file for complete search history.

(56) References Cited

U.S. PATENT DOCUMENTS 6,471,741 B1 * 10/2002 Reinbergen ............ A01N 63/00
                                                              71/6
2010/0291050 A1 * 11/2010 Daikeler ............... A23L 33/105
                                                              424/93.44

FOREIGN PATENT DOCUMENTS

| CN | 105347926 A | * | 2/2016 |
| CN | 105884485 A | * | 8/2016 |
| CN | 107307129 A | * | 11/2017 |

OTHER PUBLICATIONS

Bio Harmonic Tonic. [Facebook status Update] Retrieved from <https://www.facebook.com/Bio-Harmonic-Tonic-1779121992101475/> Aug. 14, 2017.*
Marijuana Business Daily. "Marijuana Business: MJBizCon" Fall 2017 Offical Conference Guide Nov. 2017.*

* cited by examiner

*Primary Examiner* — Jennifer A Smith
(74) *Attorney, Agent, or Firm* — Dunlap Bennett & Ludwig, PLLC; Anna Kinney

(57) ABSTRACT

A composition including a liquid microbial mixture and a gemstone elixir. The composition is applied to soil of a plant to increase the health of the plant.

12 Claims, 2 Drawing Sheets

PLANT ENHANCING COMPOSITION

CROSS-REFERENCE TO RELATED APPLICATION

This application claims the benefit of priority of U.S. provisional application No. 62/621,162, filed Jan. 24, 2018, the contents of which are herein incorporated by reference.

BACKGROUND OF THE INVENTION

The present invention relates to enhancing plant growth and, more particularly, to a plant enhancing composition.

Growing healthy crops is important to maintain a healthy human population. Currently, fertilizers are used to boost the health of crops. However, adding fertilizers to the soil is only a partial solution because the plant can only uptake so many nutrients. As the human population increases, the demand for healthy food and medicinal plants will also increase. Current methods only include adding nutrients or specific Microbes to the soil but do not attempt to increase the efficiency of microbials.

As can be seen, there is a need for an improved plant enhancing composition.

SUMMARY OF THE INVENTION

In one aspect of the present invention, a composition comprises a liquid microbial mixture and a gemstone elixir.

In another aspect of the present invention, a method of increasing plant health comprises steps of: applying a composition of a liquid microbial mixture and a gemstone elixir to soil of a plant.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a composition including a gemstone elixir, microbials, and botanicals. The microbials are a group of biological agricultural products that contain beneficial microbes. The microbials may include, but are not limited to, *Bacillus lichenformis, Bacillus coagulans, Lactobacillus plantarum, Lactobacillus buchneri*, and *Pseudomonas fluorescens*. When applied to soil of a plant, the composition increases efficiency of microbial communication in the soil or root zone (rhizosphere). The composition further enhances nutrient cycling and uptake in the plants, which yields better results in plant growth, and nutritional and therapeutic value using less nutrients Microbials use chemical signaling to communicate with each other in the soil. The composition of the present invention includes an organized field or harmonic in the liquid, which facilitates the bacteria's ability to communicate with each other in the soil. When microbials communicate more efficiently in the soil, there is a greater efficiency in the rhizosphere or root zone and nutrient cycling and uptake in the plants is enhanced. This results in better growth and better yield.

Figure 1:
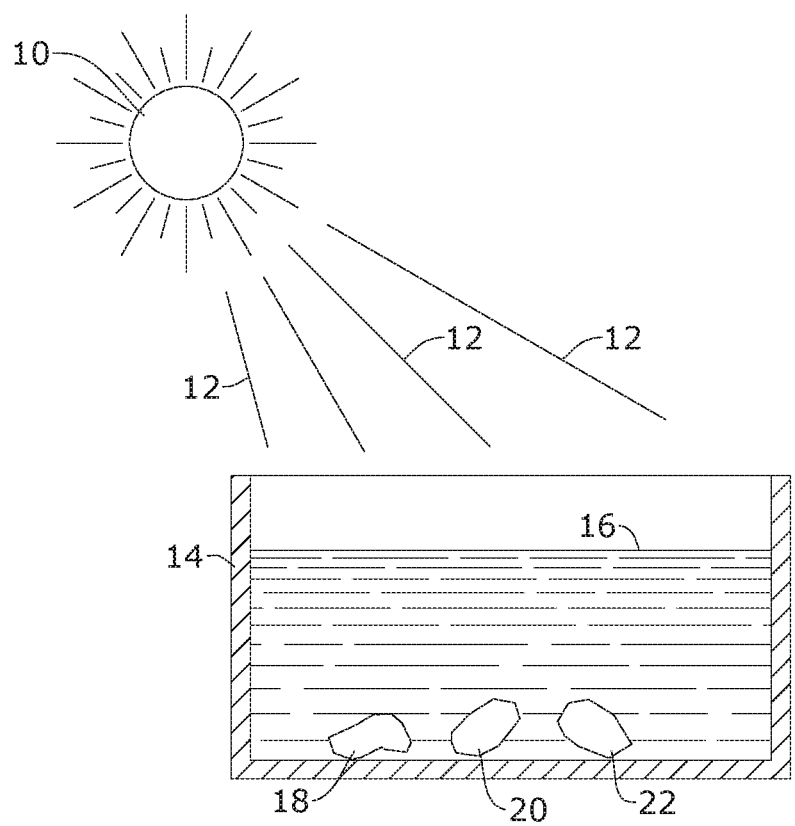
FIG. 1 is a schematic view of an embodiment of the present invention.
Figure 2:
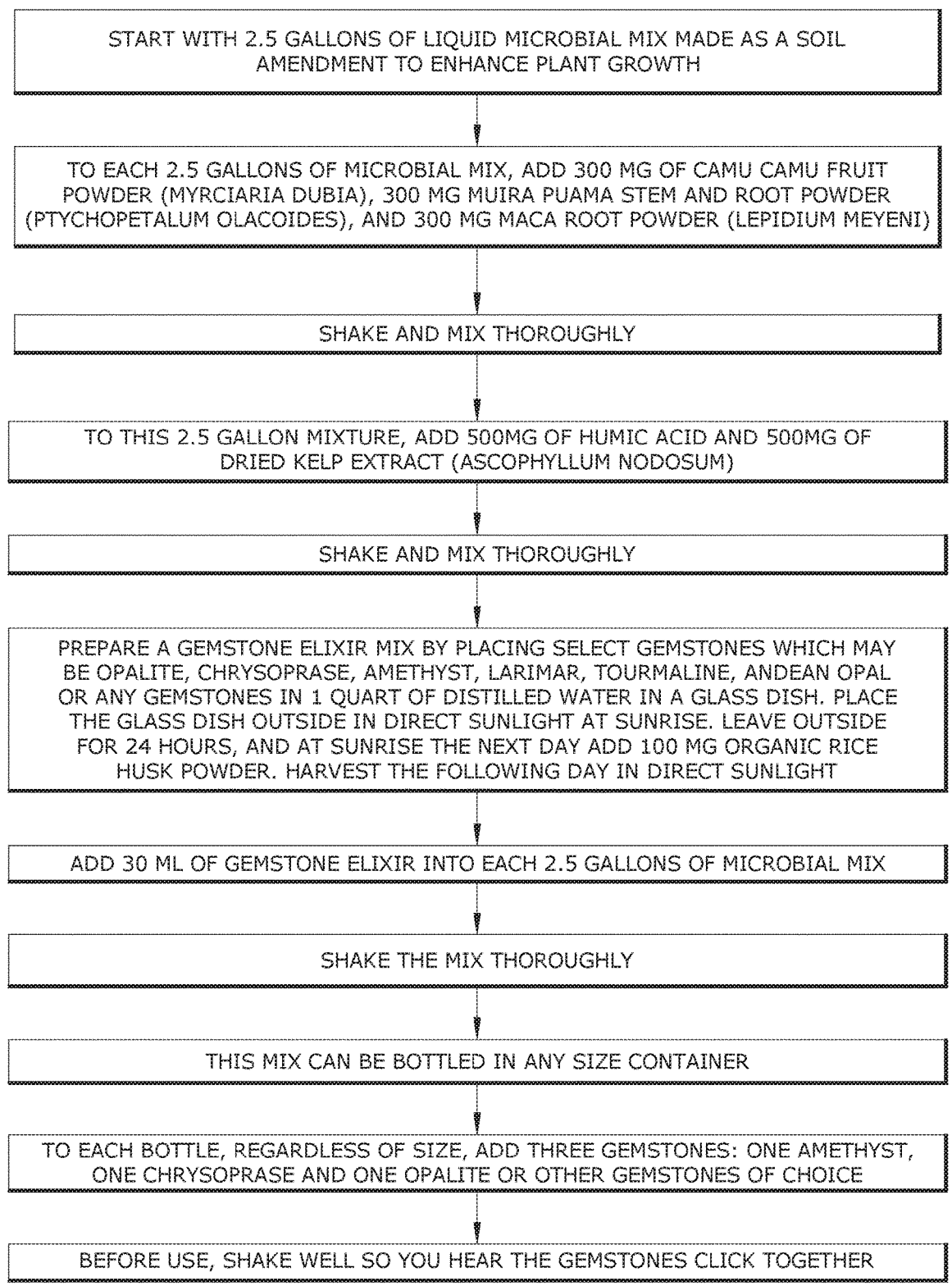
FIG. 2 is a flow chart of an embodiment of a method of the present invention.

Referring to FIGS. 1 and 2, the present invention may include the following method. Start with about 2.5 gallons liquid microbial mix made as a soil amendment to enhance plant growth. Add about 100 mg up to about 500 mg, such as about 300 mg of Camu Camu fruit powder (*Myrciaria Dubia*), about 100 mg up to about 500 mg, such as about 300 mg of Muira Puama stem and root powder (*Ptychopetalum Olacoides*), and about 100 mg up to about 500 mg, such as 300 mg of Maca root powder (*Lepidium Meyeni*) to the liquid microbial mix. The powders add nutrients and energetics of rain forest plants to the microbial mix as a source of nutrition. Shake and mix thoroughly. Add about 100 mg up to about 1 g of Dried Kelp extract (*ascophyllum nodosum*) and add about 100 mg up to about 1 g of humic acid powder to the liquid microbial mix. Shake and mix thoroughly.

Prepare a gemstone elixir by placing select gemstones 18, 20, 22 in about 1 quart of distilled water 16 in a glass dish 14. The gemstones 18, 20, 22 may include three different types of gemstones, such as a first type of gemstone 18, a second type of gemstone 20, and a third type of gemstone 22. One (about 5 g) gemstone up to about twelve gemstones may be added to the quart of distilled water. The gemstones 18, 20, 22 may include opalite, chrysoprase, amethyst, larimar, tourmaline, andean opal, or a combination thereof. Place the glass dish 14 outside in sun's 10 direct sunlight 12 at sunrise. Leave the glass dish 14 outside for about 24 hours. At sunrise the next day, add about 30 mg up to about 200 mg, such as about 100 mg organic rice husk powder. Rice husks are a natural source of silica that helps to hold the organized field created in the water by the gemstones. Leave the glass dish 14 outside for an additional 24 hours and harvest the gemstone elixir the following day in direct sunlight.

Add about 20 ml up to about 100 ml, such as about 30 mL of Gemstone elixir into each gallon up to about 5 gallons, such as about 2.5 gallons of microbial mix. Shake the mix thoroughly. This mix can be bottled in any size container. To each bottle, regardless of size, add three gemstones, one amethyst, one chrysoprase, and one opalite, or other gemstones of choice. Before use, shake the bottle so that the gemstones click together.

The composition can be used on seedlings all the way through the growth cycle to harvest. Use about 6 mL of the composition per gallon of water that is used to water the plants. Apply the mixture of water and the composition to the soil of the plants. For example, if watering a small plot of plants with 1 gallon of water, add 6 mL of the composition to the water. If watering a large amount of plants with 20 gallons of water, add 120 ml of the composition to the water.

In alternate embodiments, the present invention may be diluted and used as the foliage spray on the plants, leaves, stems, and flowers.

It should be understood, of course, that the foregoing relates to exemplary embodiments of the invention and that modifications may be made without departing from the spirit and scope of the invention as set forth in the following claims.

What is claimed is:

1. A composition comprising a liquid microbial mixture, gemstone steep, powdered Camu Camu fruit, powdered Muira Puama stem and root, and powdered Maca root.

2. The composition of claim 1, comprising proportions of:
2.5 gallons of the liquid microbial mixture; and
10 mL of the gemstone steep.

3. The composition of claim 1, comprising proportions of:
2.5 gallons of the liquid microbial mixture;
⅓ g of the powdered Camu Camu fruit;
⅓ g of the powdered Muira Puama stem and root; and
⅓ g of the powdered Maca root.

4. The composition of claim 1, further comprising kelp meal and humic acid.

5. The composition of claim 1, wherein the gemstone steep comprises water extracted from a combination of gemstones and water, wherein the gemstones are exposed to direct sunlight in the water for about 15 hours.

6. The composition of claim 5, wherein the combination further comprises rice husk powder.

7. The composition of claim 6, wherein the combination comprises proportions of:
1 quart of water;
a plurality of gemstones; and
1 g of rice husk powder.

8. The composition of claim 7, wherein the plurality of gemstones comprises opalite, chrysoprase, and amethyst.

9. The composition of claim 1, further comprising a plurality of gemstones.

10. The composition of claim 9, wherein the plurality of gemstones comprises an amethyst, a chrysoprase, and an opalite.

11. A method of increasing plant health comprising steps of:
applying a composition comprising a liquid microbial mixture, gemstone steep, and powdered Camu Camu fruit, Muira Puama stem and root, and Maca root to soil of a plant.

12. The method of claim 11, wherein the application comprises proportions of:
1 gallon of water; and
5 mL of the composition.

* * * * *